(12) United States Patent
Babin

(10) Patent No.: US 11,124,152 B2
(45) Date of Patent: Sep. 21, 2021

(54) BUCKLE ASSEMBLIES FOR USE WITH CHILD SEATS AND OTHER PERSONAL RESTRAINT SYSTEMS

(71) Applicant: Shield Restraint Systems, Inc., Elkhart, IN (US)

(72) Inventor: Brian George Babin, Bristol, IN (US)

(73) Assignee: Shield Restraint Systems, Inc., Elkhart, IN (US)

( * ) Notice: Subject to any disclaimer, the term of this patent is extended or adjusted under 35 U.S.C. 154(b) by 278 days.

(21) Appl. No.: 16/197,246

(22) Filed: Nov. 20, 2018

(65) Prior Publication Data
US 2020/0156589 A1    May 21, 2020

(51) Int. Cl.
| | |
|---|---|
| *B60R 22/48* | (2006.01) |
| *B60N 2/26* | (2006.01) |
| *B60R 22/10* | (2006.01) |
| *B60R 22/12* | (2006.01) |

(52) U.S. Cl.
CPC .............. *B60R 22/48* (2013.01); *B60N 2/265* (2013.01); *B60R 22/105* (2013.01); *B60R 22/12* (2013.01); *B60R 2022/4816* (2013.01); *B60R 2022/4866* (2013.01)

(58) Field of Classification Search
CPC ....... B60R 22/48; B60R 22/105; B60R 22/12; B60R 22/4816; B60R 2022/4866; B60N 2/265
USPC .................................................... 280/801.1
See application file for complete search history.

(56) References Cited

U.S. PATENT DOCUMENTS

| | | |
|---|---|---|
| 3,799,610 A | 3/1974 | Hollins |
| 4,604,773 A | 8/1986 | Weber et al. |
| 4,679,852 A | 7/1987 | Anthony et al. |
| 4,699,401 A | 10/1987 | Saenz |
| 4,715,096 A | 12/1987 | Fleming et al. |
| 4,738,485 A | 4/1988 | Rumpf |
| 4,785,906 A | 11/1988 | Kang |

(Continued)

FOREIGN PATENT DOCUMENTS

| | | |
|---|---|---|
| DE | 4420457 | 12/1995 |
| EP | 0562740 | 9/1993 |

(Continued)

*Primary Examiner* — John D Walters
*Assistant Examiner* — Hilary L Johns
(74) *Attorney, Agent, or Firm* — Perkins Coie LLP

(57) ABSTRACT

Buckle assemblies having electronic engagement indicating devices for use with child seats and other restraint systems are disclosed herein. In some embodiments, a restraint system for use with a child seat can include first and second web connectors which each have a corresponding tongue, and a buckle assembly including a housing that encloses a latch configured to engage the tongues. The buckle assembly can further include a magnet operably coupled to the latch, and an electronic switch operably positioned in the housing. The latch is configured to move between a first latch position in which the latch is disengaged from the tongues, and a second latch position in which the latch is engaged with the tongues. Movement of the latch from the first latch position to the second latch position moves the magnet relative to the electronic switch. In some embodiments, the electronic switch can include a Hall effect sensor that outputs a signal in response to movement of the magnetic field that is indicative of the engagement status of the latch.

20 Claims, 12 Drawing Sheets

(56) References Cited

U.S. PATENT DOCUMENTS

| | | |
|---|---|---|
| 4,884,652 A | 12/1989 | Vollmer |
| 4,886,315 A | 12/1989 | Johnson |
| 4,989,299 A | 2/1991 | Morita |
| 5,038,446 A | 8/1991 | Anthony et al. |
| 5,061,012 A | 10/1991 | Parker et al. |
| 5,142,748 A | 9/1992 | Anthony et al. |
| 5,182,837 A | 2/1993 | Anthony et al. |
| 5,220,713 A | 6/1993 | Lane |
| 5,233,732 A | 8/1993 | Yamanishi |
| 5,283,933 A | 2/1994 | Wiseman |
| 5,383,708 A | 1/1995 | Nagasaka et al. |
| 5,429,419 A | 7/1995 | Kassie |
| 5,458,369 A | 10/1995 | Matsuki et al. |
| 5,482,352 A | 1/1996 | Leal et al. |
| 5,526,556 A | 6/1996 | Czank |
| 5,624,156 A | 4/1997 | Leal et al. |
| 5,681,094 A | 10/1997 | Bown et al. |
| 5,699,594 A | 12/1997 | Czank et al. |
| 5,765,774 A | 6/1998 | Maekawa et al. |
| D397,063 S | 8/1998 | Anthony et al. |
| 5,788,281 A | 8/1998 | Yanagi et al. |
| 5,813,097 A | 9/1998 | Woellert et al. |
| 5,851,025 A | 12/1998 | Gamboa |
| 5,873,599 A | 2/1999 | Bauer |
| 5,890,762 A | 4/1999 | Yoshida |
| 5,898,366 A | 4/1999 | Brown et al. |
| 5,970,587 A | 10/1999 | Knox |
| 6,024,408 A | 2/2000 | Bello et al. |
| 6,079,744 A | 6/2000 | Husby et al. |
| 6,139,111 A | 10/2000 | Pywell et al. |
| 6,182,783 B1 | 2/2001 | Bayley |
| 6,305,713 B1 | 10/2001 | Pywell et al. |
| 6,309,024 B1 | 10/2001 | Busch |
| 6,357,790 B1 | 3/2002 | Swann |
| 6,374,168 B1 | 4/2002 | Fujii |
| 6,389,661 B1 | 5/2002 | Brown et al. |
| 6,540,293 B1 | 4/2003 | Quackenbush |
| 6,547,218 B2 | 4/2003 | Landy |
| 6,582,015 B2 | 6/2003 | Jessup |
| 6,606,770 B1 | 8/2003 | Badrenas |
| 6,647,597 B2 | 11/2003 | Reiter |
| 6,698,070 B2 | 3/2004 | Chen |
| 6,701,587 B1 | 3/2004 | Sato |
| 6,773,075 B2 | 8/2004 | Rouhana et al. |
| 6,811,186 B1 | 11/2004 | Fraley et al. |
| 6,817,629 B2 | 11/2004 | Herberg et al. |
| 6,837,547 B2 | 1/2005 | Delventhal et al. |
| 6,868,591 B2 | 3/2005 | Dingman et al. |
| 6,997,474 B2 | 2/2006 | Midorikawa et al. |
| 7,011,341 B2 | 3/2006 | Herberg et al. |
| 7,014,005 B2 * | 3/2006 | Martinez ................ B60R 22/48 |
| | | 180/268 |
| 7,077,472 B2 | 7/2006 | Steffens |
| 7,077,475 B2 | 7/2006 | Boyle |
| 7,131,668 B2 | 11/2006 | Go |
| 7,152,282 B2 | 12/2006 | Costa |
| 7,159,948 B1 | 1/2007 | Wolf |
| 7,178,208 B2 | 2/2007 | Bentsen et al. |
| 7,201,399 B2 | 4/2007 | Frank et al. |
| 7,201,444 B2 | 4/2007 | Schimmoller et al. |
| 7,216,827 B2 | 5/2007 | Tanaka et al. |
| 7,246,854 B2 | 7/2007 | Dingman et al. |
| 7,278,684 B2 | 10/2007 | Boyle |
| 7,296,825 B1 | 11/2007 | Zia et al. |
| 7,350,767 B2 | 4/2008 | Huang |
| 7,410,212 B2 | 8/2008 | Lawrence et al. |
| 7,422,283 B2 | 9/2008 | Patterson et al. |
| 7,463,161 B2 | 12/2008 | Griffin et al. |
| 7,466,221 B1 | 12/2008 | Lehr |
| 7,520,036 B1 | 4/2009 | Baldwin |
| 7,625,048 B2 | 12/2009 | Rouhana et al. |
| 7,673,906 B2 | 3/2010 | Bell |
| 7,698,791 B2 | 4/2010 | Pezza |
| 7,770,969 B2 | 8/2010 | Boyle et al. |
| 7,775,557 B2 | 8/2010 | Bostrom et al. |
| 7,819,472 B2 | 10/2010 | Hutchinson et al. |
| 7,976,092 B2 | 7/2011 | Meredith et al. |
| 7,980,630 B2 | 7/2011 | Pos |
| 8,002,348 B2 | 8/2011 | Jessup et al. |
| 8,007,043 B1 | 8/2011 | Vouong |
| 8,016,318 B2 | 9/2011 | Nezaki |
| 8,016,676 B2 | 9/2011 | Carter |
| 8,038,213 B2 | 10/2011 | Owens |
| 8,066,303 B2 | 11/2011 | Nezaki |
| 8,113,584 B2 | 2/2012 | Boyle et al. |
| 8,251,445 B2 | 8/2012 | Pos |
| 8,272,689 B2 | 9/2012 | Biaud et al. |
| 8,613,470 B2 * | 12/2013 | Sickon ................... B60R 22/48 |
| | | 280/801.1 |
| 9,814,282 B2 | 11/2017 | Merrick |
| 10,357,083 B2 * | 7/2019 | Babin ................ A44B 11/2561 |
| 2004/0060761 A1 * | 4/2004 | Almaraz ................ B60R 22/48 |
| | | 180/268 |
| 2004/0111845 A1 * | 6/2004 | Lee ................... B60R 21/01546 |
| | | 24/633 |
| 2004/0226767 A1 * | 11/2004 | Martinez ........... B60R 21/01546 |
| | | 180/268 |
| 2004/0251367 A1 | 12/2004 | Suzuki et al. |
| 2006/0038436 A1 | 2/2006 | Siewertsen et al. |
| 2006/0049677 A1 | 3/2006 | Lawrence et al. |
| 2006/0137153 A1 | 6/2006 | Cerruti |
| 2007/0001495 A1 | 1/2007 | Boyle et al. |
| 2007/0075574 A1 | 4/2007 | James |
| 2007/0210639 A1 | 9/2007 | Berger et al. |
| 2007/0228802 A1 | 10/2007 | Nakhla |
| 2007/0261217 A1 | 11/2007 | Buscart |
| 2008/0093833 A1 | 4/2008 | Odate |
| 2008/0141505 A1 | 6/2008 | Borst |
| 2008/0173523 A1 | 7/2008 | Bahr et al. |
| 2008/0246316 A1 | 10/2008 | Carine et al. |
| 2009/0069983 A1 | 3/2009 | Humbert et al. |
| 2009/0183348 A1 | 7/2009 | Walton et al. |
| 2009/0278390 A1 | 11/2009 | Carter |
| 2010/0033001 A1 | 2/2010 | Boyer |
| 2010/0052385 A1 | 3/2010 | Martini |
| 2010/0201170 A1 | 8/2010 | Brandl et al. |
| 2010/0213753 A1 | 8/2010 | Humbert |
| 2010/0253121 A1 | 10/2010 | Buckingham |
| 2011/0006569 A1 | 1/2011 | Davies |
| 2011/0291451 A1 | 12/2011 | Westman |
| 2012/0080917 A1 | 4/2012 | Miller et al. |
| 2012/0193955 A1 | 8/2012 | Seike |
| 2012/0310483 A1 | 12/2012 | Lanter |
| 2013/0038101 A1 | 2/2013 | Friedman |
| 2015/0298651 A1 | 10/2015 | Klaasen |
| 2016/0121848 A1 | 5/2016 | Seibert |
| 2018/0078001 A1 * | 3/2018 | Babin ................ A44B 11/2561 |

FOREIGN PATENT DOCUMENTS

| | | |
|---|---|---|
| EP | 1472949 | 11/2004 |
| EP | 1547484 | 6/2005 |
| EP | 1631166 | 9/2008 |
| JP | 2005178513 | 7/2005 |
| JP | 4604482 | 1/2011 |
| WO | 2006044809 | 4/2006 |
| WO | 2012037398 | 3/2012 |
| WO | 2013016310 | 1/2013 |

\* cited by examiner

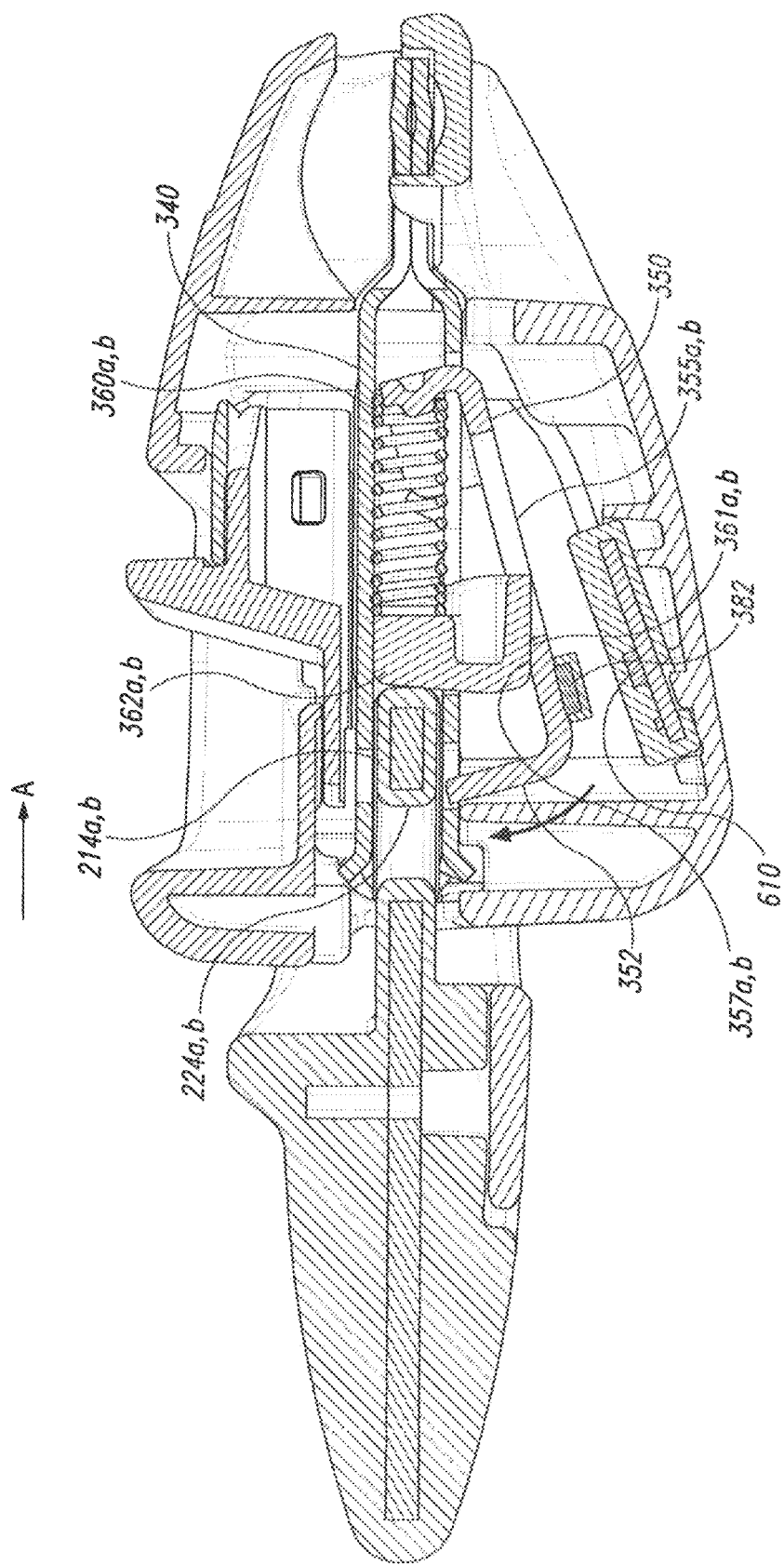

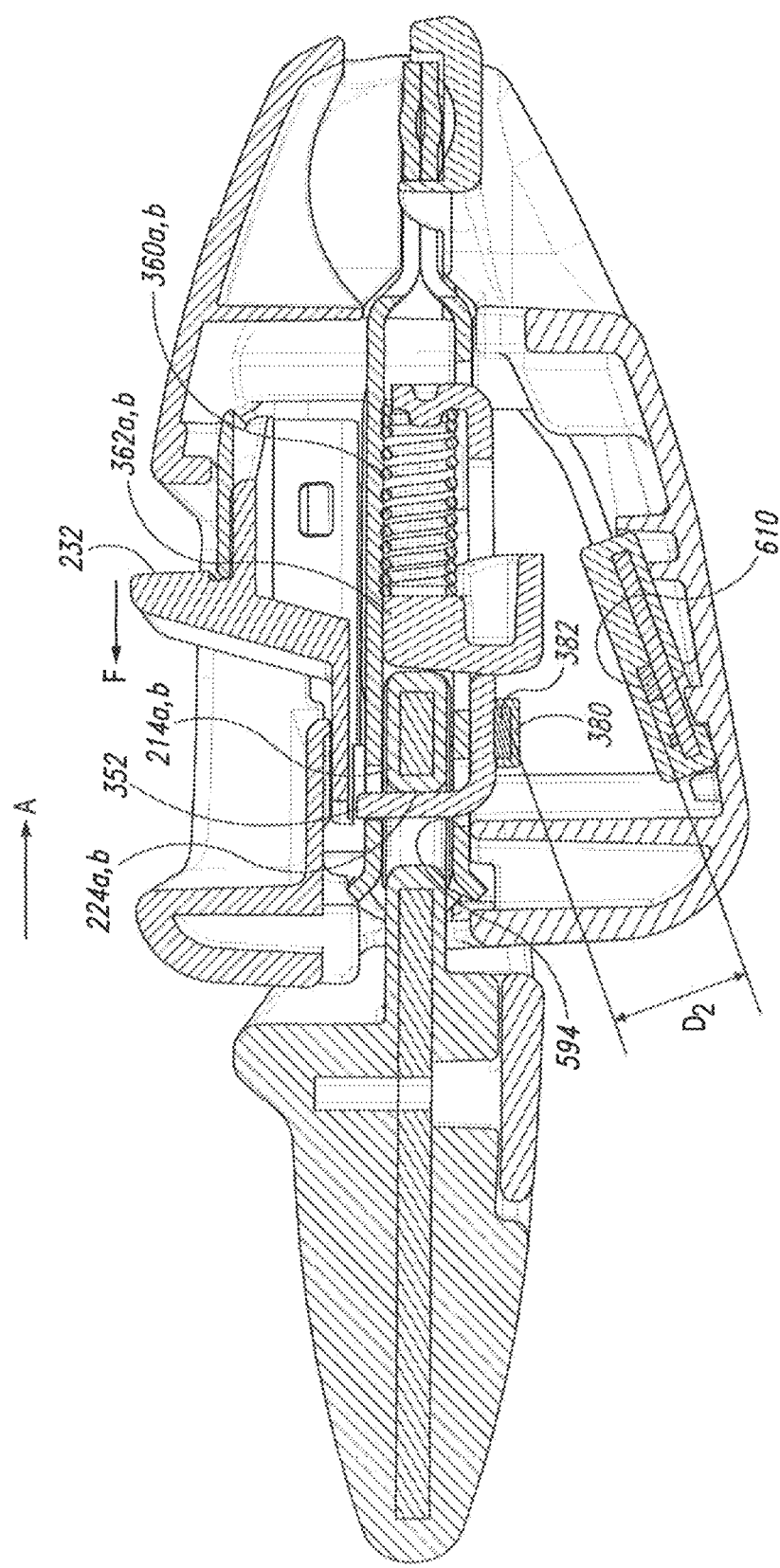

BUCKLE ASSEMBLIES FOR USE WITH CHILD SEATS AND OTHER PERSONAL RESTRAINT SYSTEMS

TECHNICAL FIELD

The present disclosure is generally related to personal restraint systems for use in vehicles and, more particularly, to buckle assemblies for use with child seats and other personal restraint systems.

BACKGROUND

Many different types of personal restraint systems are used in automobiles and other vehicles. Such systems can include, for example, seat belts for use by adults and children of sufficient size, and child seats for use with toddlers and small children. These restraint systems typically include buckles for joining two or more lengths of web together that restrain the occupant in their seat.

Some buckles include a device to indicate the engagement status of the buckle (e.g., latched or unlatched). Such devices can include mechanical components that provide a visible or audible indication when the buckle is properly engaged. Such devices can also include mechanical switches that open or close an electrical circuit in response to engagement or disengagement of the buckle. The electrical circuit is typically connected to an electronic component (e.g., a visual indicator such as a light, and/or an audible indicator such as a buzzer) that provides a signal if, for example, the vehicle is moving but the occupant has not buckled their seat belt. For example, U.S. Pat. No. 9,814,282, filed on Feb. 2, 2016, and titled "HARSH ENVIRONMENT BUCKLE ASSEMBLIES AND ASSOCIATED SYSTEMS AND METHODS," and U.S. patent application Ser. No. 15/706,489, filed on Sep. 15, 2017, and titled "BUCKLE ASSEMBLIES AND ASSOCIATED SYSTEMS AND METHODS FOR USE WITH CHILD SEATS AND OTHER RESTRAINT SYSTEMS," are incorporated herein by reference in their entireties.

A variety of factors can affect the function of conventional buckle engagement indicating devices. For example, contamination (e.g., dirt, grime, fluids, etc.) can hinder operation of the moving parts. Additionally, space constraints can make it difficult to incorporate electronic indicating devices in conventional buckles in a reliable manner.

BRIEF DESCRIPTION OF THE DRAWINGS

FIGS. 8A-8C are a series of side cross-sectional views illustrating three stages of engagement of the web connectors of FIGS. 1 and 2 with the buckle assembly in accordance with embodiments of the present technology.

DETAILED DESCRIPTION

Figure 1:
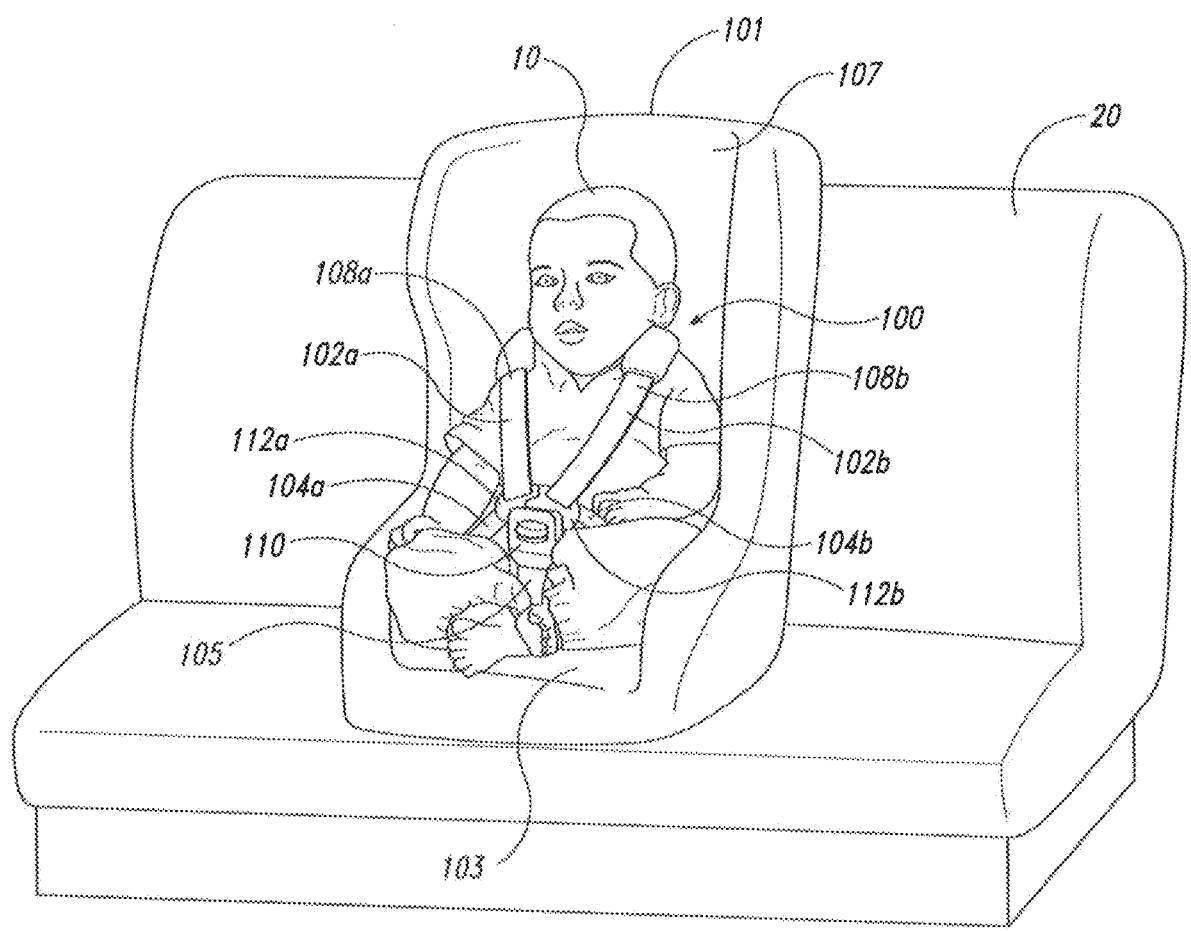
FIG. 1 is an isometric view of child seat having a buckle assembly configured in accordance with embodiments of the present technology.

The following disclosure describes various embodiments of buckle assemblies having engagement indicating devices and systems, and associated methods of manufacture and use. In some embodiments, buckle assemblies described herein can be used with a child seat and can include a housing configured to receive a first tongue of a first web connector and a second tongue of a second web connector. The buckle assemblies can also include a latch operably positioned within the housing and configured to move between a first latch position in which the latch is disengaged from the tongues and a second latch position in which the latch is engaged with the tongues. In some embodiments, the buckle assembly can further include a magnet operably coupled to the latch, and an electronic switch operably positioned in the housing. In these embodiments, movement of the latch from the first latch position to the second latch position moves the magnet relative to the electronic switch, which in turn changes an operational state of the electronic switch. For example, in some embodiments the electronic switch can include a Hall effect sensor, and movement of the magnet relative to the switch can change the output signal (e.g., a voltage) from the sensor, thereby activating (or deactivating) an alarm to notify, for example, a vehicle operator of the engagement status of the buckle assembly.

Certain details are set forth in the following description and in FIGS. 1-9 to provide a thorough understanding of various embodiments of the present technology. In other instances, well-known structures, materials, operations and/or systems often associated with vehicle occupant restraint systems, buckle assemblies, indicating switches, electronic sensors, Hall effect sensors and switches, etc. are not shown or described in detail in the following disclosure to avoid unnecessarily obscuring the description of the various embodiments of the technology. Those of ordinary skill in the art will recognize, however, that the present technology can be practiced without one or more of the details set forth herein, and/or with other structures, methods, components, and so forth.

The accompanying Figures depict embodiments of the present technology and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the invention. Many of the details, dimensions, angles and other features shown in the Figures are merely illustrative of particular embodiments of the technology. Accordingly, other embodiments can have other details, dimensions, angles and features without departing from the spirit or scope of the present invention. In addition, those of ordinary skill in the art will appreciate that further embodiments of the invention can be practiced without several of the details described below.

In the Figures, identical reference numbers identify identical, or at least generally similar, elements. To facilitate the discussion of any particular element, the most significant digit or digits of any reference number refers to the Figure in which that element is first introduced. For example, element 110 is first introduced and discussed with reference to FIG. 1.

FIG. 1 is an isometric view illustrating a restraint system 100 having a buckle assembly 110 configured in accordance with embodiments of the present technology. In the illustrated embodiment, the restraint system 100 secures a vehicle occupant (e.g., a child or infant 10) in a child seat 101. The child seat 101 includes a base portion 103 and a back portion 107. The child seat 101 can be secured to a vehicle seat 20 using various systems known in the art. Such systems can include, for example, belts or webs (not shown) having proximal ends attached to the child seat 101 and distal ends attached to anchors (also not shown) in the bight of the vehicle seat 20 with suitable coupling devices known in the art. In other embodiments, the child seat 101 can be secured to the vehicle seat 20, and/or other vehicle structures, using other suitable systems and methods known in the art. Moreover, in further embodiments the child seat 101 or variations thereof can be reversed such that the child seat 101 faces rearward toward the vehicle seat 20.

In the illustrated embodiment, the restraint system 100 includes a first web 102a and a second web 102b extending from the back portion 107 of the child seat 101. The webs 102 can include various types of woven fabric materials and/or other suitable belt or strap materials known in the art that provide sufficient strength, flexibility, durability and/or other characteristics. In this embodiment, each of the webs 102 slidably passes through an aperture in a corresponding web connector 112 (identified individually as a first web connector 112a and a second web connector 112b). Passing the webs 102 through the web connectors 112 divides each of the webs 102 into a corresponding shoulder web portion 108 (identified individually as a first shoulder web portion 108a and a second shoulder web portion 108b), and a corresponding lap web portion 104 (identified individually as a first lap web portion 104a and a second lap web portion 104b). The lap web portions 104 extend away from each other toward opposite sides of the bight region of the child seat 101 between the back portion 107 and the seat portion 103. The end portions of the webs 102 can be secured or otherwise affixed to the child seat 101 and/or other adjacent structures using various methods and devices known in the art.

The buckle assembly 110 is attached to a distal end portion of a crotch web 105 that extends upwardly from the base portion 103 of the child seat 101. The proximal end portion of the crotch web 105 can be secured to the child seat 101 and/or other adjacent structures using various methods and devices known in the art. Although FIG. 1 illustrates one possible use of the buckle assembly 110 (e.g., use with a "five point" harness), those of ordinary skill in the art will appreciate that the buckle assembly 110, the web connectors 112, and/or the other components of the restraint system 100 described herein are not limited to this use and can be used in a number of other restraint system arrangements and configurations, including other child restraint systems, adult restraint systems, etc.

Figure 2:
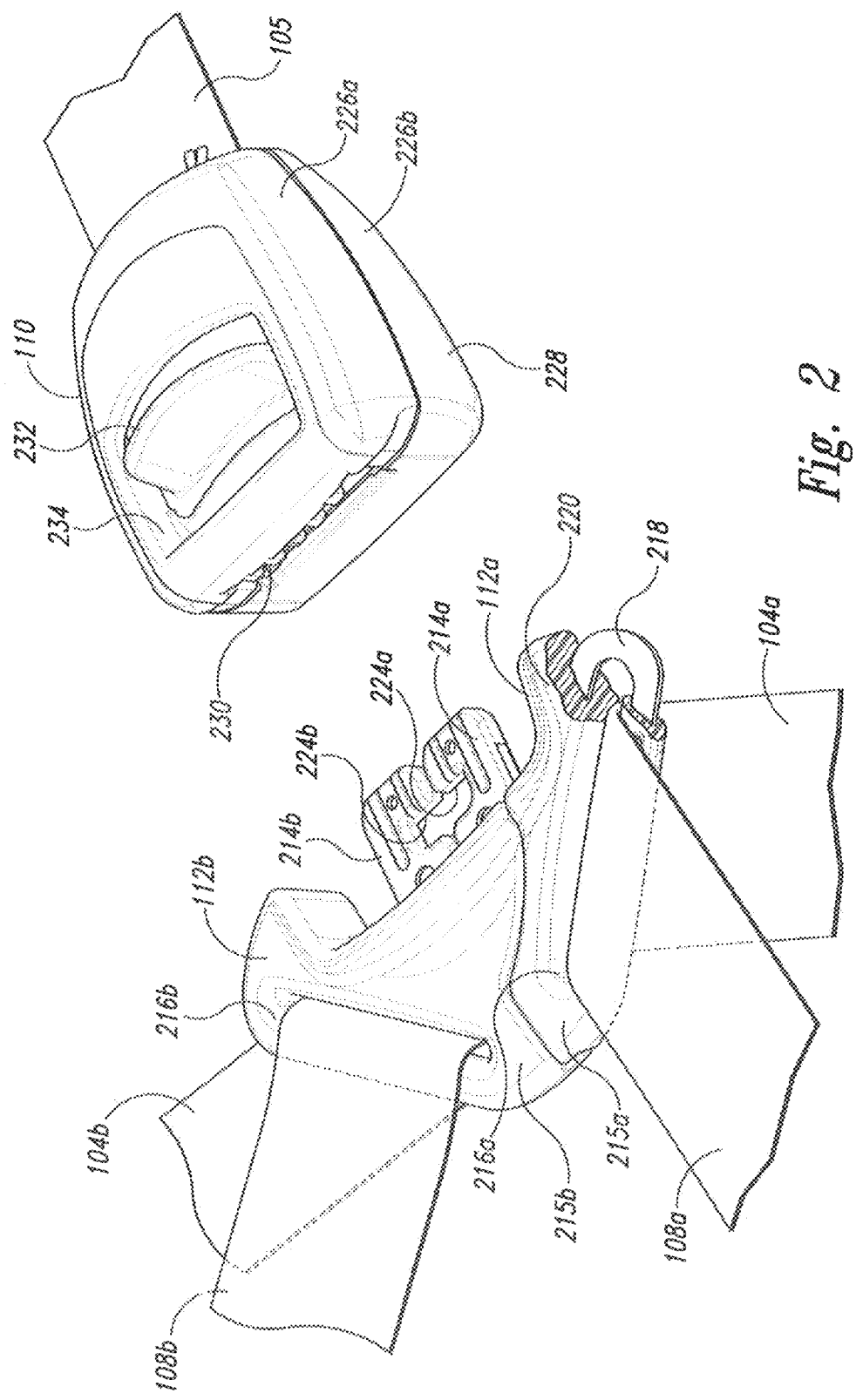
FIG. 2 is an enlarged isometric view of the buckle assembly of FIG. 1 disengaged from a pair of corresponding web connectors, in accordance of the embodiments of the present technology.

FIG. 2 is an enlarged isometric view showing the web connectors 112 prior to engagement with the buckle assembly 110 in accordance with embodiments of the present technology. Each of the web connectors 112 includes a tongue 214 (identified individually as a first tongue 214a and a second tongue 214b) and a corresponding web receiving portion 215 (identified individually as a first web receiving portion 215a and a second web receiving portion 215b). Each of the web receiving portions 215 includes a corresponding opening 216 (identified individually as a first web opening 216a and second web opening 216b) through which the corresponding web 102 passes. In the illustrated embodiment, each of the web connectors 112 can include an internal frame 218 covered by an overmold 220. The frame 218 can be formed from a suitably strong material, such as steel plate, and the overmold 220 can include a plastic material that is molded over the frame 218.

Each of the tongues 214 includes a corresponding engagement feature 224 (identified individually as a first engagement feature 224a and a second engagement feature 224b). In the illustrated embodiment, each of the engagement features 224 is defined by an edge portion of a recess formed in an inner side of the corresponding tongue 214. As described in more detail below, the engagement features 224 are configured to engage a corresponding locking feature in the buckle assembly 110. In other embodiments, other types of suitable engagement features, recesses, and corresponding locking features known in the art can be used with the connector tongue and/or buckle assembly embodiments described herein. In the illustrated embodiment, the web connectors 112 are configured to be removably mated or interlocked with each other as shown in FIG. 2 prior to simultaneous insertion of the tongues 214 into the buckle assembly 110. In other embodiments, the connector tongues 214 can be configured to be inserted individually into the buckle assembly 110.

The buckle assembly 110 includes a housing 228 having an upper portion 226a and a lower portion 226b. The housing 228 defines a tongue opening 230 configured to receive the connector tongues 214 for engagement with the buckle assembly 110. In the illustrated embodiment, the buckle assembly 110 further includes a release actuator 232 in the form of a knob or button that projects from an opening 234 in the housing 228 and, as described in greater detail below, can move (e.g., slide) forward and aft to operate the buckle assembly 110. In other embodiments, buckle assemblies configured in accordance with the present technology can include other types of release actuators including, for example, depressible buttons, rotatable knobs, switches, etc. In some embodiments, the housing 228 and the release actuator 232 can be formed from suitable plastic materials known in the art, such as an injection molded plastic materials. In other embodiments, the housing 228 and/or the release actuator 232 can be formed from other suitable materials known in the art.

Figure 3:
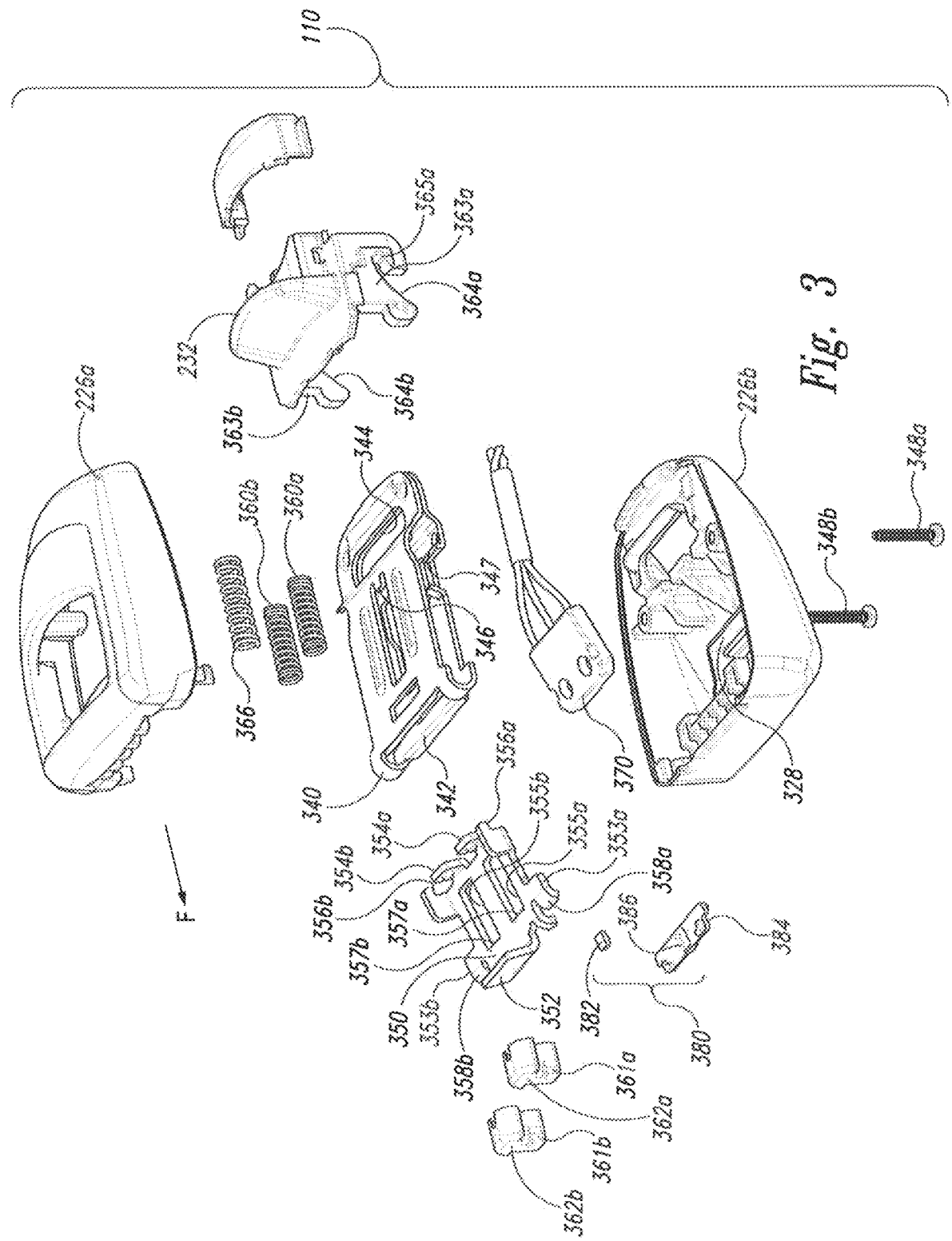
FIG. 3 is an exploded isometric view of the buckle assembly of FIGS. 1 and 2 configured in accordance with embodiments of the present technology.

FIG. 3 is an exploded isometric view of the buckle assembly 110 configured in accordance with embodiments of the present technology. In the illustrated embodiment, the buckle assembly 110 includes a frame 340 having an opening 342 formed in a distal or forward end portion thereof to receive the connector tongues 214 (FIG. 2), and an aperture or opening 344 formed in a proximal or rear end portion thereof to receive the crotch web 105 (FIG. 2) for attachment thereto. The lower housing portion 226b and the upper housing portion 226a are fixedly secured to the frame 340 by fasteners 348 (e.g., screws; identified individually as a first fastener 348a and a second fastener 348b). In some embodiments, the frame 340 can be formed from a suitable material, such as a steel sheet or plate that is stamped in a flat pattern and then formed to shape using known methods.

The buckle assembly 110 further includes a latch 350 that, as described in greater detail below, is operably coupled to the frame 340. The latch 350 includes a locking feature 352 configured to engage the connector tongues 214 (FIG. 2). In the illustrated embodiment, the locking feature 352 includes a projection having a surface portion that extends upwardly from the latch 350 proximate a forward end portion thereof. The latch 350 further includes a pair of longitudinal slots 355 formed therein (identified individually as a first slot 355a and a second slot 355b), and each of the slots 355 includes a corresponding forward edge portion 357. As described in greater detail below, each of the slots 355 is configured to provide clearance for a heel portion 361 of a corresponding ejector 362 (identified individually as a first ejector 362a and a second ejector 362b), as the ejectors 362 slide back and forth on the frame 340. The ejectors 362 are biased toward the forward end portion of the frame 340 in direction F by means of biasing members 360 (identified individually as a first biasing member 360a and a second biasing member 360b) which are resiliently compressed between the corresponding ejector 362 and a corresponding spring retainer 354 (identified individually as a first spring retainer 354a and a second spring retainer 354b) which projects upwardly from a rear portion of the latch 350. In the illustrated embodiment, the biasing members 360 are coil springs. However, in other embodiments it is contemplated that buckle assemblies configured in accordance with embodiments of the present technology can utilize other types of biasing members for biasing tongue ejectors.

In addition to the foregoing features, the latch 350 further includes tabs 353 (identified individually as a first tab 353a and a second tab 353b) which extend outwardly from opposite sides of the latch 350. In the illustrated embodiment, each of the tabs 353 includes a corresponding curved (e.g., rounded) bearing surface 358 (identified individually as a first bearing surface 358a and a second bearing surface 358b), and the release actuator 232 includes corresponding bearing surfaces 364 (identified individually as a first bearing surface 364a and a second bearing surface 364b) on opposite side portions 363 thereof (identified individually as a first side portion 363a and a second side portion 363b). As described in greater detail below, the bearing surfaces 364 are configured to bear against the bearing surfaces 358 to pivot the latch 350 downwardly and retract the locking feature 352 from the connector tongues 214 (FIG. 2). The latch 350 further includes two coupling features 356 (identified individually as a first coupling feature 356a and a second coupling feature 356b) extending from the rear end portion of the latch 350. As described in greater detail below, each of the coupling features 356 is configured to engage a corresponding edge feature 347 on opposite sides of the frame 340 to operably couple the latch 350 to the frame 340.

In addition to the bearing surfaces 364, the release actuator 232 further includes a latch engagement feature 365 (identified individually as a first latch engagement feature 365a and a second latch engagement feature 365b) on each of the side portions 363. In the illustrated embodiment, the latch engagement features 365 include recesses that are configured to receive and engage the corresponding tabs 353 on the latch 350 to secure the latch 350 in the locked position, as described in greater detail below. As also described in greater detail below, a biasing member 366 (e.g., a coil spring) is operably positioned between the release actuator 232 and a tab 346 on the frame 340 to bias the release actuator 232 in the forward direction F.

The buckle assembly 110 further includes an electronic switch assembly 370 and a switch actuator assembly 380. In some embodiments, the switch assembly 370 is fixedly positioned in a pocket 328 in the lower housing portion 226b, and the switch actuator assembly 380 is fixedly attached to the latch 350. More specifically, in the illustrated embodiment the actuator assembly 380 includes a magnet 382 that is encased in an overmold 384 and fixedly attached to an underside of the latch 350 proximate the forward end portion thereof. As described in greater detail below, movement of the magnet 382 relative to the switch assembly 370 as a result of latch engagement and/or disengagement, can activate the switch assembly 370 and provide a corresponding signal to, for example, a vehicle warning system (which can also be referred to as an alarm system) to indicate the status of the buckle assembly 110 (e.g., latched or unlatched) to, for example, a vehicle operator.

Figure 4:
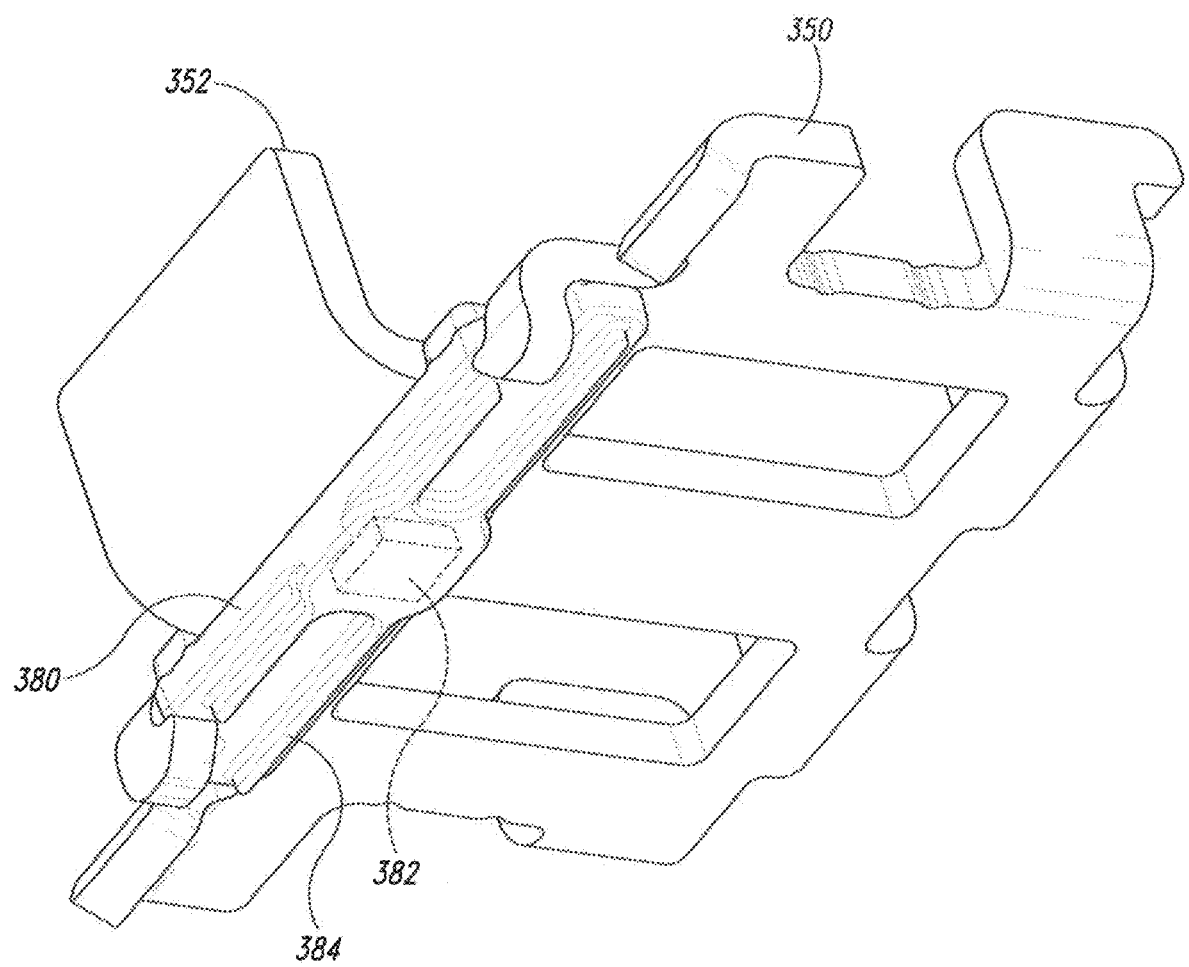
FIG. 4 is an enlarged bottom isometric view of a switch actuator assembly attached to a buckle latch in accordance with embodiments of the present technology.

FIG. 4 is an enlarged bottom isometric view showing the switch actuator assembly 380 fixedly attached to the underside of the latch 350. In some embodiments, the magnet 382 can be adhesively bonded or otherwise attached to the latch 350, and then the magnet 382 can be encased in the overmold 384 by a low pressure overmolding process to further secure the magnet 382 to the latch 350 and prevent contamination and/or damage to the magnet 382 in use.

Figure 5A:
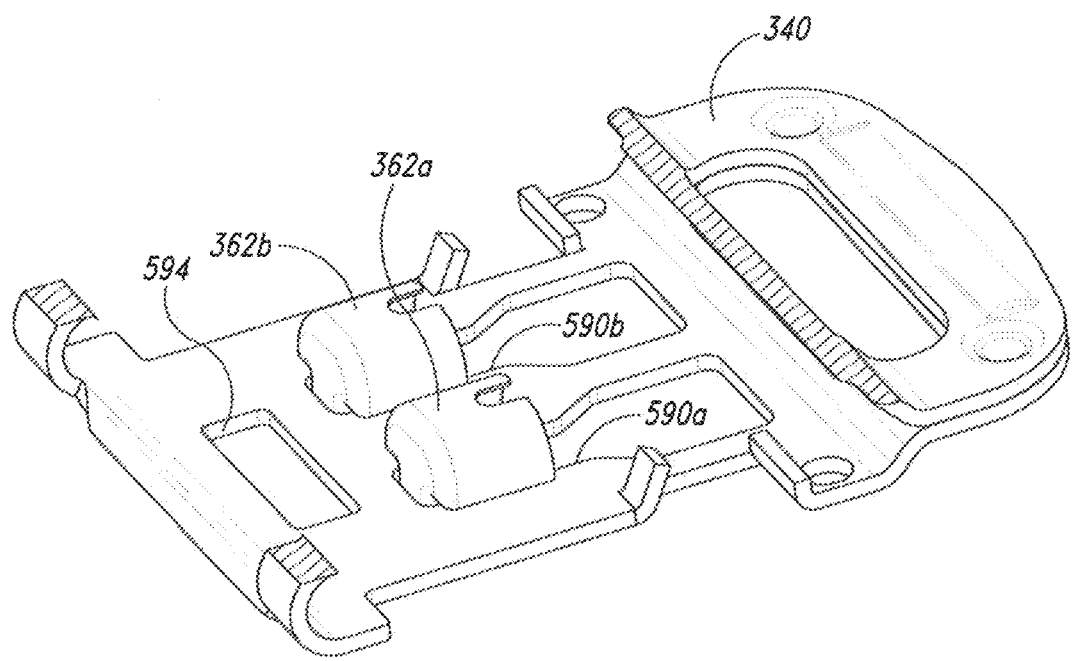
FIGS. 5A and 5B are top cross-sectional isometric views.
Figure 5B:
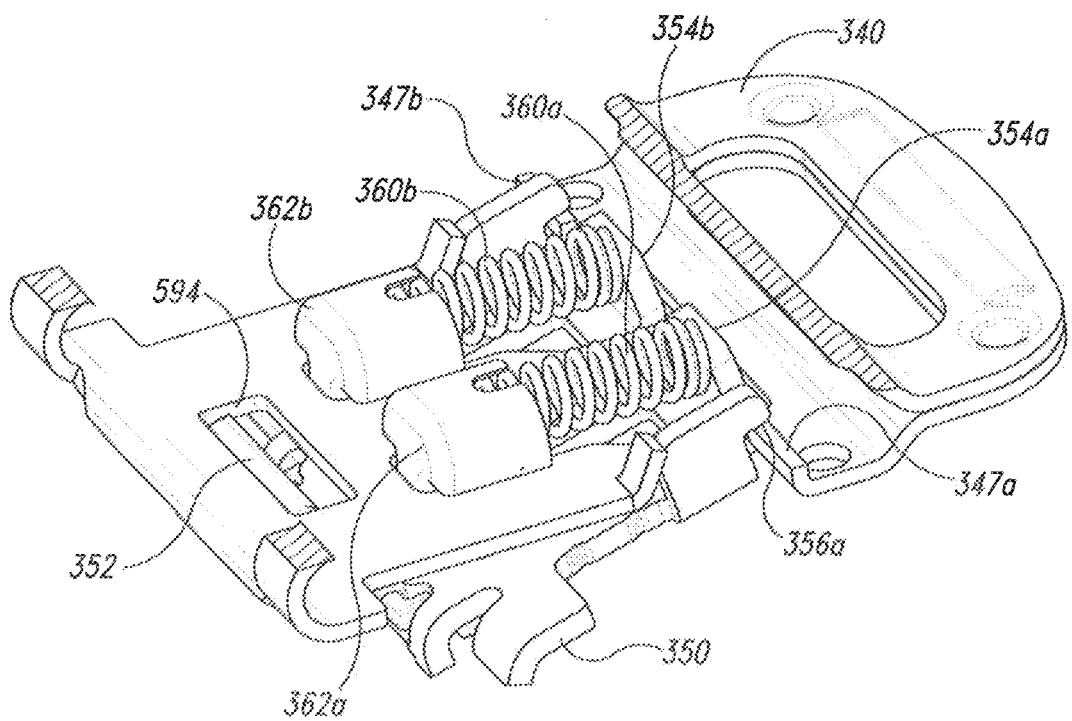

FIGS. 5A and 5B are top cross-sectional isometric views illustrating installation of the ejectors 362 on the frame 340 in accordance with embodiments of the present technology. An upper portion of the frame 340 is removed in FIGS. 5A and 5B for purposes of illustration. Referring first to FIG. 5A, in the illustrated embodiment the frame 340 includes a locking feature opening 594 and a pair of slots 590a, b. Each of the slots 590 slideably receives the heel portion 361 (FIG. 3) of the corresponding ejector 326. Referring next to FIG. 5B, the forward end portion of each of the biasing members 360 is inserted into the corresponding ejector 362, and the aft end portion of each biasing member 360 is engaged with the corresponding retainer 354 on the frame 340. As a result, the biasing members 360 bias the ejectors 362 toward the forward end portion of the slots 590 as shown in FIG. 5B.

As also shown in FIG. 5B, the coupling features 356 on the rear end portion of the latch 350 are engaged with the corresponding edge features 347 on the frame 340 to pivotally couple the latch 350 to the frame 340. When the latch 350 is in the retracted position shown in FIG. 5B, the distal end of the locking feature 352 does not extend upwardly through the opening 594 in the frame 340. As described in greater detail below, when the tongues 214 (FIG. 2) are properly inserted into the buckle assembly 110, the latch 350 pivots upwardly so that the locking feature 352 extends through the opening 594 to engage the tongues 214.

Figure 5C:
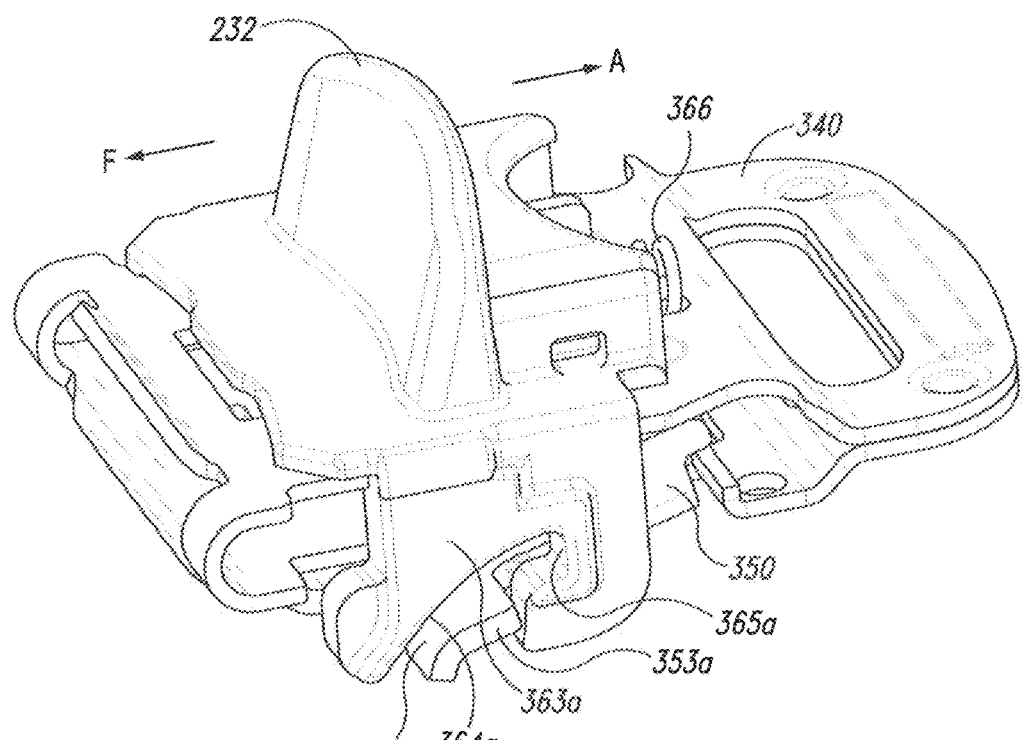
FIG. 5C is a top isometric view, illustrating assembly of some of the components of the buckle assembly of FIGS. 1 and 2, configured in accordance with embodiments of the present technology.

FIG. 5C is a top isometric view of the release actuator 232 operably coupled to the frame 340/latch 350 assembly shown in FIG. 5B, in accordance with embodiments of the present technology. As this view shows, the actuator 232 is positioned so that the side portions 363 extend downwardly over the sides of the frame 340. In this configuration, the bearing surfaces 364 on the actuator side portions 363 are positioned adjacent to the corresponding bearing surfaces 358 on the latch 350. Additionally, the biasing member 366 is operably positioned between the tab 346 on the frame 340 and a corresponding feature on the backside of the release actuator 232 (FIG. 7) to bias the actuator 232 in the direction F.

Figure 6A:
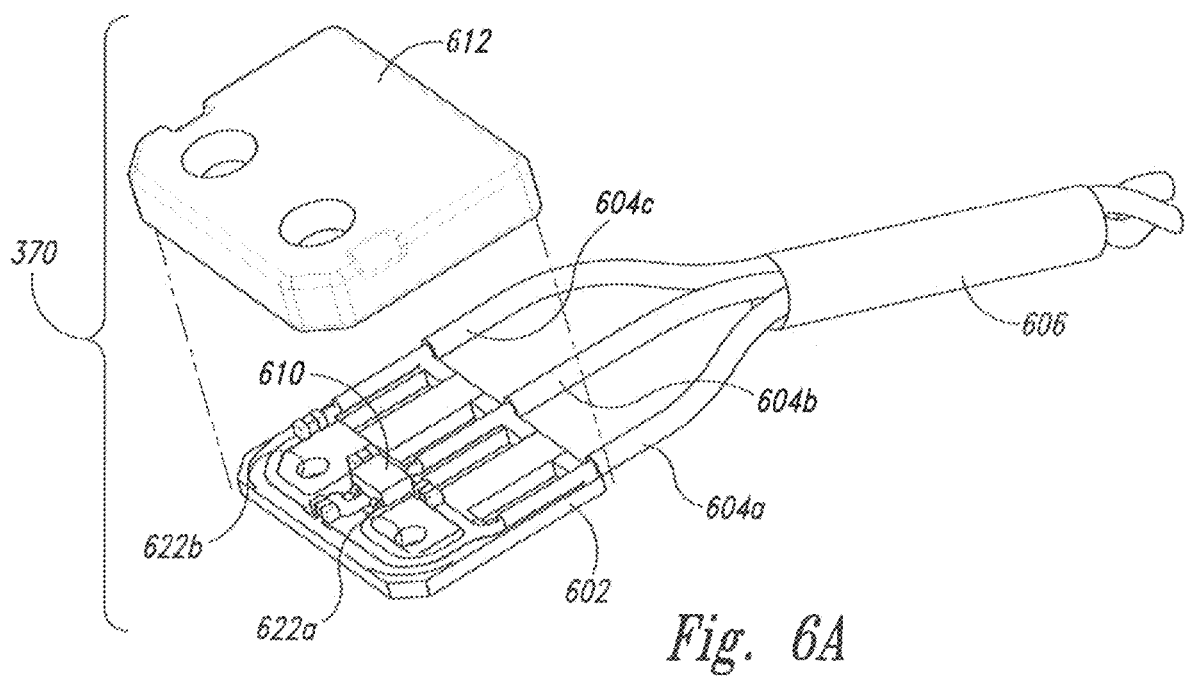
FIG. 6A is a partially exploded top isometric view of an electronic switch assembly configured in accordance with embodiments of the present technology.
Figure 6B:
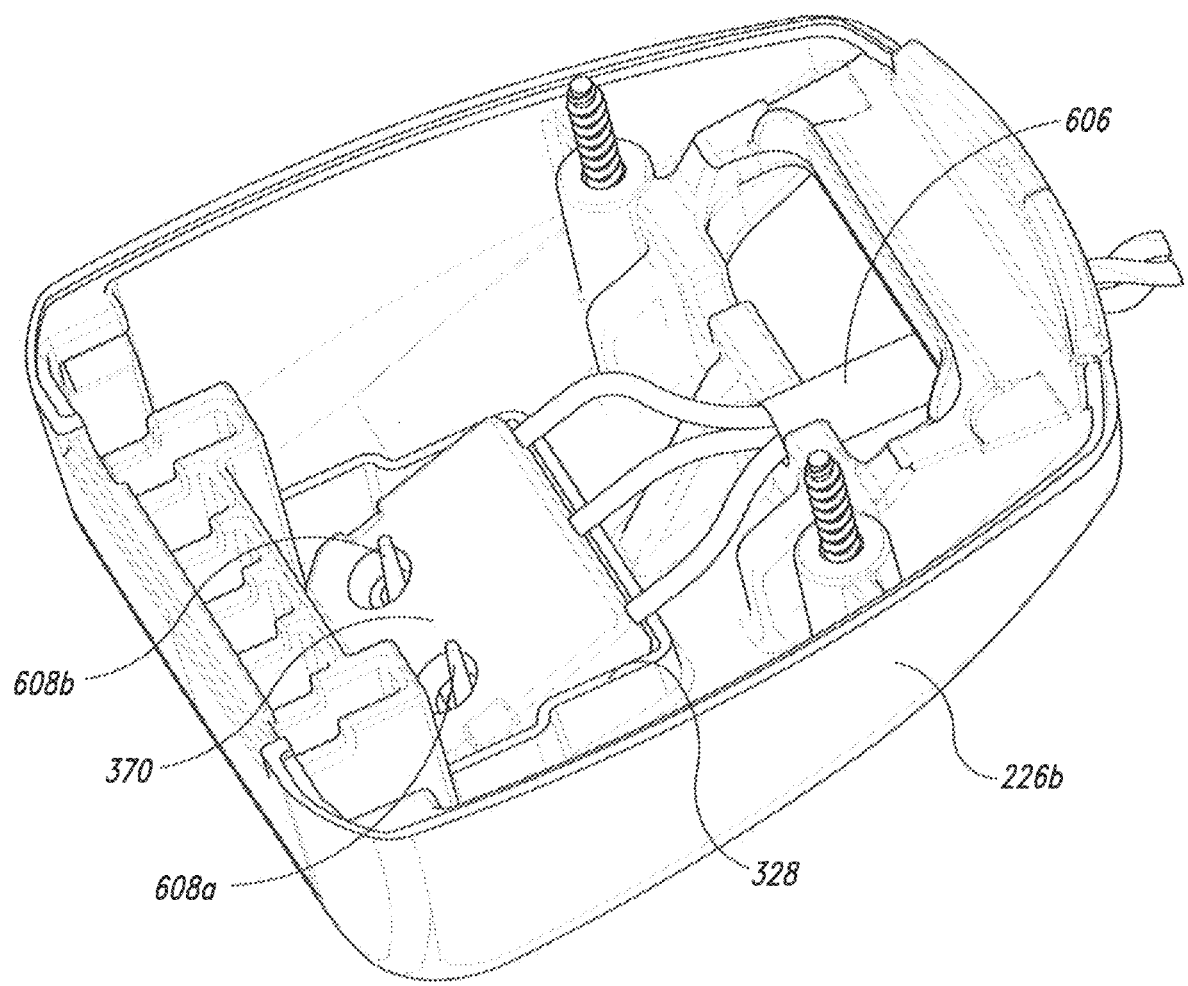
FIG. 6B is a top isometric view of the switch assembly of FIG. 6A installed in a lower portion of a buckle housing in accordance with embodiments of the present technology.

FIG. 6A is a partially exploded top isometric view of the switch assembly 370, and FIG. 6B is a top isometric view of the switch assembly 370 installed in the lower housing portion 226b, in accordance with embodiments of the present technology. Referring first to FIG. 6A, in the illustrated embodiment the switch assembly 370 can include a switch 610 that is mounted to a printed circuit board (PCB) 602. In some embodiments, the switch 610 can include a Hall effect sensor configured to vary output voltage in response to a magnetic field. For example, in some embodiments the switch 610 can be an A3211 pole independent Hall effect switch available from Allegro Microsystems, LLC of Worcester, Mass. As will be understood by those of ordinary skill in the art, additional electronic devices (e.g., DC amplifiers, logic switching circuits and voltage regulators) can also be mounted to the PCB 602 to improve the sensitivity, hysteresis, and/or output voltage of the Hall effect sensor. In other embodiments, the switch assembly 370 can include other types of Hall effect switches, other types of electronic switches, and other types of electromechanical switches, etc., that change their operational state or otherwise respond to the presence (and/or removal) of a magnet field or other actuating mechanism. For example, in other embodiments it is contemplated that the switch assembly 370 can include a suitable reed switch.

In some embodiments, PCB 602 electrically connects the switch 610 to one or more electrical leads 604. For example, in the illustrated embodiment the switch 610 can be electrically connected to a first lead 604a (e.g., a supply lead), a second lead 604b (e.g., a ground lead), and a third lead 604c (e.g., an output lead). Each of the leads 604 can include a shielded wire, and as described in greater detail below, one or more of the leads 604 can be operably connected to, for example, a vehicle warning system that can respond to signals received from the switch 610 and provide corresponding indications of the buckle status via, for example, an audible warning device (e.g., a buzzer, beeper, etc.) and/or a visible warning device (e.g., a dashboard light, etc.).

Referring to FIGS. 6A and 6B together, in some embodiments the PCB 602 can be located in the pocket 328 of the lower housing portion 226b by means of pins 608a, b that extend upwardly through corresponding holes 622 in the PCB 602. Once the PCB 602 has been properly positioned in the pocket 328, the PCB 602 can be encased in an overmold 612 to protect it from detrimental contamination, damage, etc. in use. In some embodiments, the overmold 612 can be formed by a low pressure overmold process in which plastic is molded around the PCB 602 to thereby bond or otherwise sealably attach the PCB 602 to the lower housing portion 226b. The leads 604 can be enclosed in a strain relief 606 (e.g., a rubber or plastic tube that reduces flexing and protects the leads 604) where they exit the lower housing portion 226b.

Although in the embodiments described above the switch assembly 370 is attached to the lower housing portion 226b and the actuator assembly 380 is attached to the latch 350, in other embodiments it is contemplated that the actuator assembly 380 can be attached to the lower portion of the housing 226b (or other portion of the housing 228) and the switch assembly can be attached to the latch 350.

Figure 7:
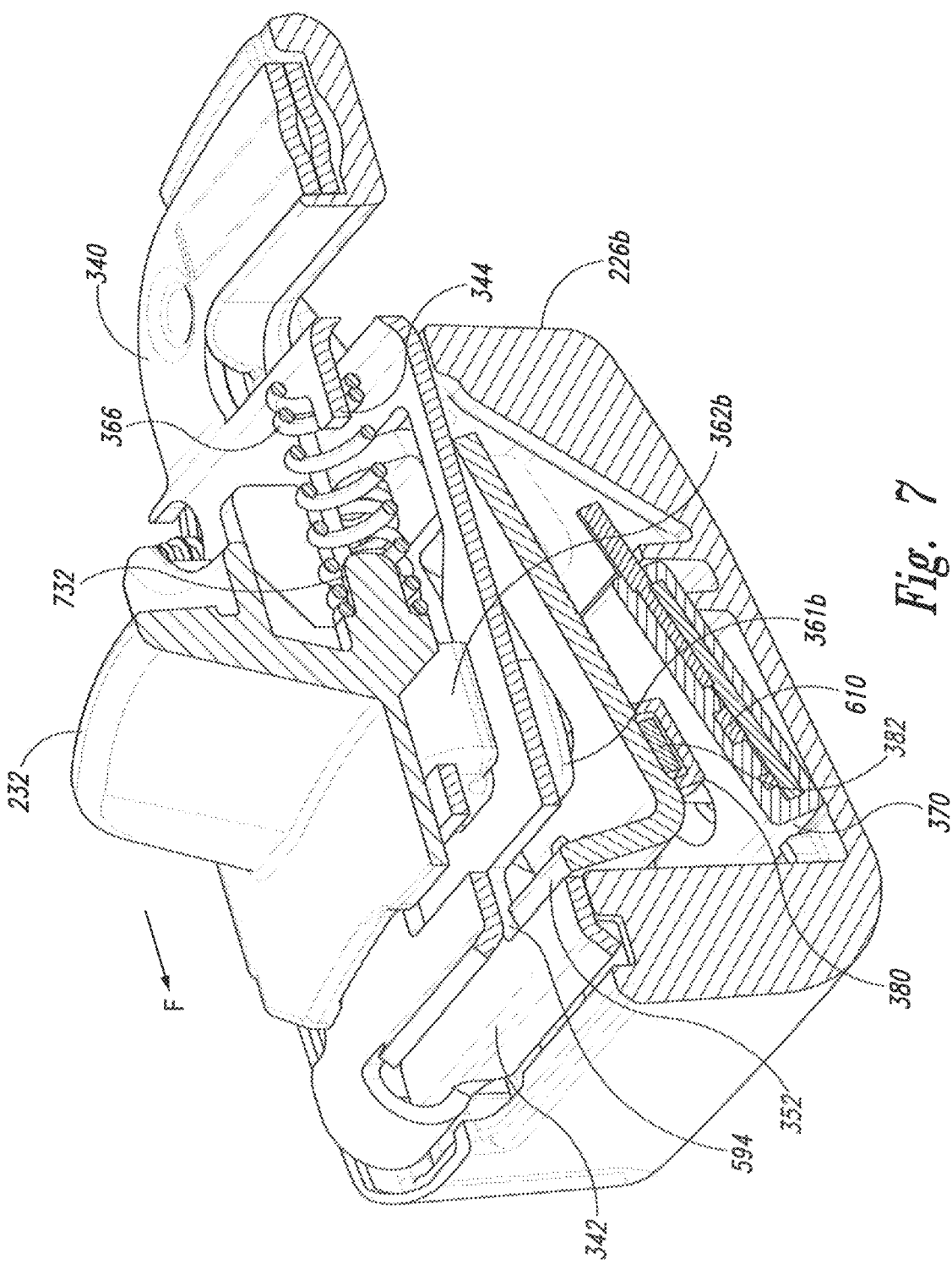
FIG. 7 is a side cross-sectional isometric view of the buckle assembly of FIGS. 1 and 2 with an upper housing portion removed for purposes of illustration.

FIG. 7 is a side cross-sectional isometric view of the buckle assembly 110 with the upper housing portion 226a (FIG. 3) removed for purposes of illustration. In the illustrated embodiment, the switch assembly 370 has been installed in the lower housing portion 226b as described above with reference to FIG. 6B, and the buckle latching mechanism shown in FIG. 5C has been installed onto the lower housing portion 226b above the switch assembly 370. As this view illustrates, a forward end portion of the biasing member 366 is received on a post 732 on the backside of the release actuator 232, and biases the actuator 232 in the forward direction F. Before the tongues 214 (FIG. 2) are inserted into the buckle assembly 110, the ejectors 362 are biased all the way forward in the corresponding slots 590 (FIG. 5A) so that the ejector heel portions 361 hold the latch 350 in the retracted or unlatched position shown in FIG. 7. In the unlatched position, the latch locking feature 352 is retracted so that it does not extend through the opening 594 in the frame 340.

Figure 8A:
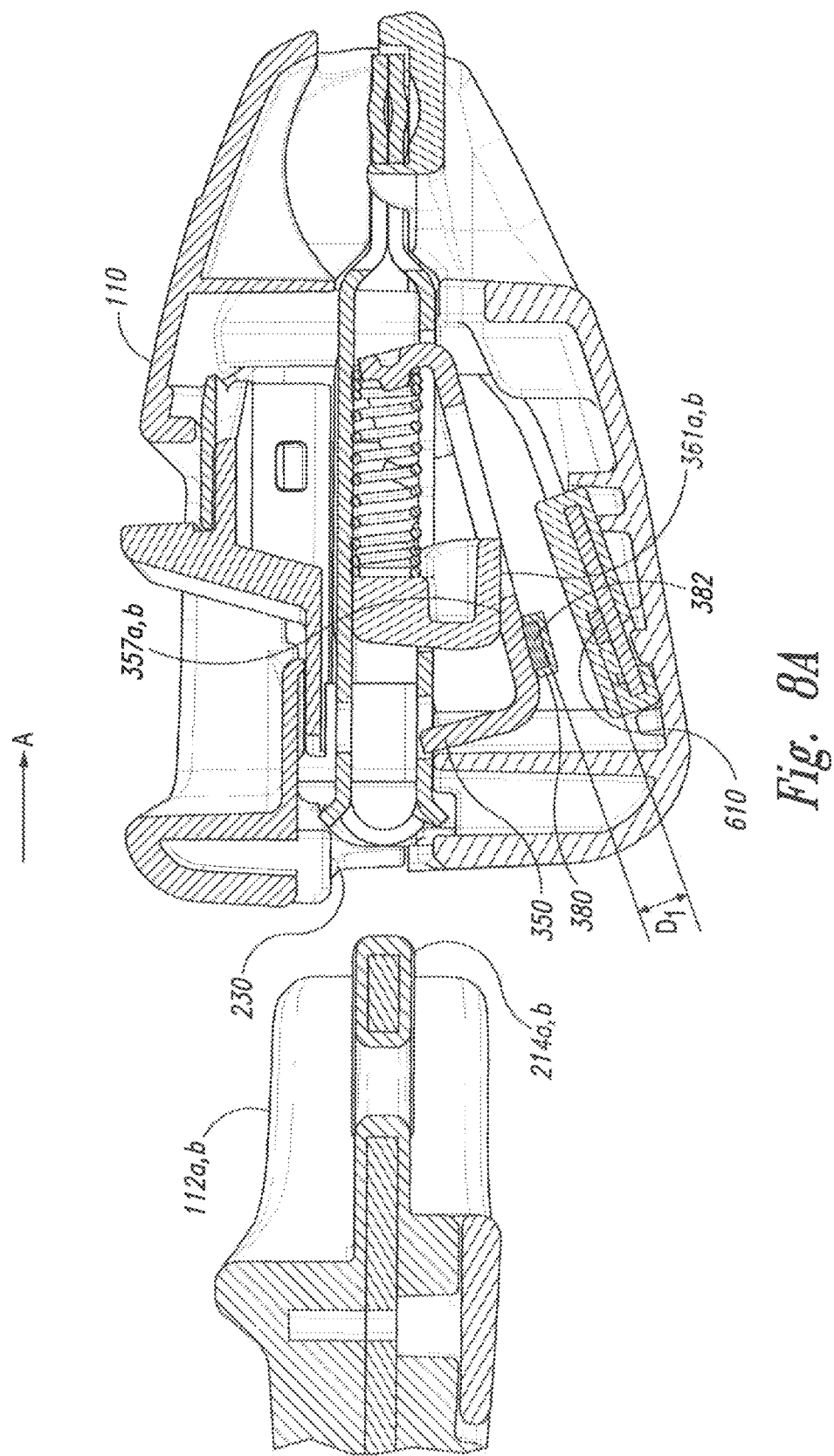

FIGS. 8A-8C are a series of cross-sectional side views illustrating engagement of the web connectors 112 with the buckle assembly 110 in accordance with embodiments of the present technology. Referring first to FIG. 8A, the web connectors 112 have been mated together as shown in FIG. 2, and the tongues 214 are positioned for insertion in direction A into the buckle assembly 110 through the opening 230. As noted above, prior to insertion of the tongues 214, the latch 350 is held in the unlatched position by the ejector heel portions 361 which bear against the corresponding edge portions 357 of the latch 350 (see also FIG. 3).

Turning next to FIG. 8B, the tongues 214 have been inserted through the opening 230 in the buckle assembly 110 and contact the corresponding ejectors 362. As the tongues 214 continue to drive the ejectors 362 aft in the direction A, the ejector heel portions 361 slide off the latch edge portions 357 and into the slots 355, enabling the latch 350 to pivot upwardly under the force of the biasing members 360. As the latch 350 pivots upwardly, the locking feature 352 moves through the opening 594 in the frame 340 and the adjacent recesses 224 in the tongues 214 to engage the tongues 214 as shown in FIG. 8C. Accordingly, both tongues 214 must be inserted into the buckle assembly 110 at the same time to engage the latch 350 with the tongues 214. Otherwise, if only a single tongue 214 is inserted into the buckle assembly 110, the ejector 362 associated with the other tongue will hold the latch 350 in the unlatched position shown in FIG. 8A, thereby preventing the latch 350 from pivoting upward and engaging either of the tongues 214. Although, in the illustrated embodiment, the latch 350 is configured to pivot between the unlatched and latched positions, as those of ordinary skill in the art will appreciate, in other embodiments buckle assemblies configured in accordance with the present disclosure can include latches that translate, move linearly, and/or move in other ways between unlatched and latched positions. Accordingly, the present technology is not limited to use with latches that pivot into position.

As shown in FIG. 5C, as the latch 350 moves into the latched position, the tabs 353 move into alignment with the corresponding recesses 365 in the side portions 363 of the release actuator 232, thereby allowing the biasing member 366 (FIG. 7) to drive the release actuator 232 forward in direction F until the tabs 353 are received in the corresponding recesses 365 (FIGS. 3 and 5C). When the tabs 353 are engaged with the side portions 363 of the release actuator 232 in this manner, the latch 350 is locked in the latched position with the locking feature 352 extending upwardly through the recesses 224 and engaging the connector tongues 214.

To disengage the connector tongues 214 from the buckle assembly 110, a user can move the buckle release actuator 232 in direction A. Referring to FIGS. 5C and 8C together, movement of the release actuator 232 in the direction A when the latch 350 is in the locked position causes the recesses 365 in the actuator side portions 363 to disengage and move away from the corresponding tabs 353 on the latch 350. Additionally, this movement of the actuator 232 causes the bearing surfaces 364 on the actuator side portions 363 to contact the corresponding bearing surfaces 358 on the latch tabs 353, thereby driving the latch 350 downwardly away from the latched position shown in FIG. 8C to the unlatched position shown in FIG. 8A. As the latch 350 pivots downwardly to this position, the biasing members 360 drive the corresponding ejectors 362 forward in direction F to the position shown in FIG. 8B, to thereby retain the latch 350 in the unlatched position as described above.

As shown in FIG. 8A, when the latch 350 is in the unlatched position, the magnet 382 is generally spaced apart from the switch 610 by first distance D1. For example, in some embodiments the distance D1 can be from about 0.020 inch to about 0.5 inch, or from about 0.040 inch to about 0.3 inch, or from about 0.080 inch to about 0.20 inch. In other embodiments, the magnet 382 can be spaced apart from the switch 610 by other distances D1 when the latch 350 is in the unlatched position. As shown in FIG. 8C, when the latch 350 moves to the latched position, the magnet 382 is generally spaced apart from the switch 610 by a second distance D2 that is greater than the first distance D1. For example, in some embodiments the distance D2 can be from about 0.06 inch to about 0.70 inch, or from about 0.08 inch to about 0.50 inch, or from about 0.10 inch to about 0.30 inch. In other embodiments, the magnet 382 can be spaced apart from the switch 610 by other distances D2 when the latch 350 is in the latched position.

As noted above, in some embodiments the switch 610 can include a Hall effect sensor that detects the magnetic flux density caused by the magnet 382 and generates an output voltage proportional to the magnetic field strength. For example, the switch 610 can be configured to provide a first output voltage when the latch 350 is in the unlatched position and the magnet 382 is positioned proximate the switch 610 as shown in FIG. 8A, and a second (e.g., lower) output voltage when the latch 350 moves into the latched position and the magnet 382 is positioned further away from the switch 610 as shown in FIG. 8C. Accordingly, in operation the switch 610 can provide an output signal that is indicative of the engagement status of the buckle assembly 110. As described in greater detail below, in some embodiments the switch 610 can be operably connected (via, e.g., wired or wireless connectivity) to a vehicle system that responds to the output signals from the switch 610 by activating (or deactivating) an indicator (e.g., an audible indicator such as buzzer, a visual indicator such as a light, etc.) that alerts a user to the engagement status of the buckle assembly 110.

Figure 9:
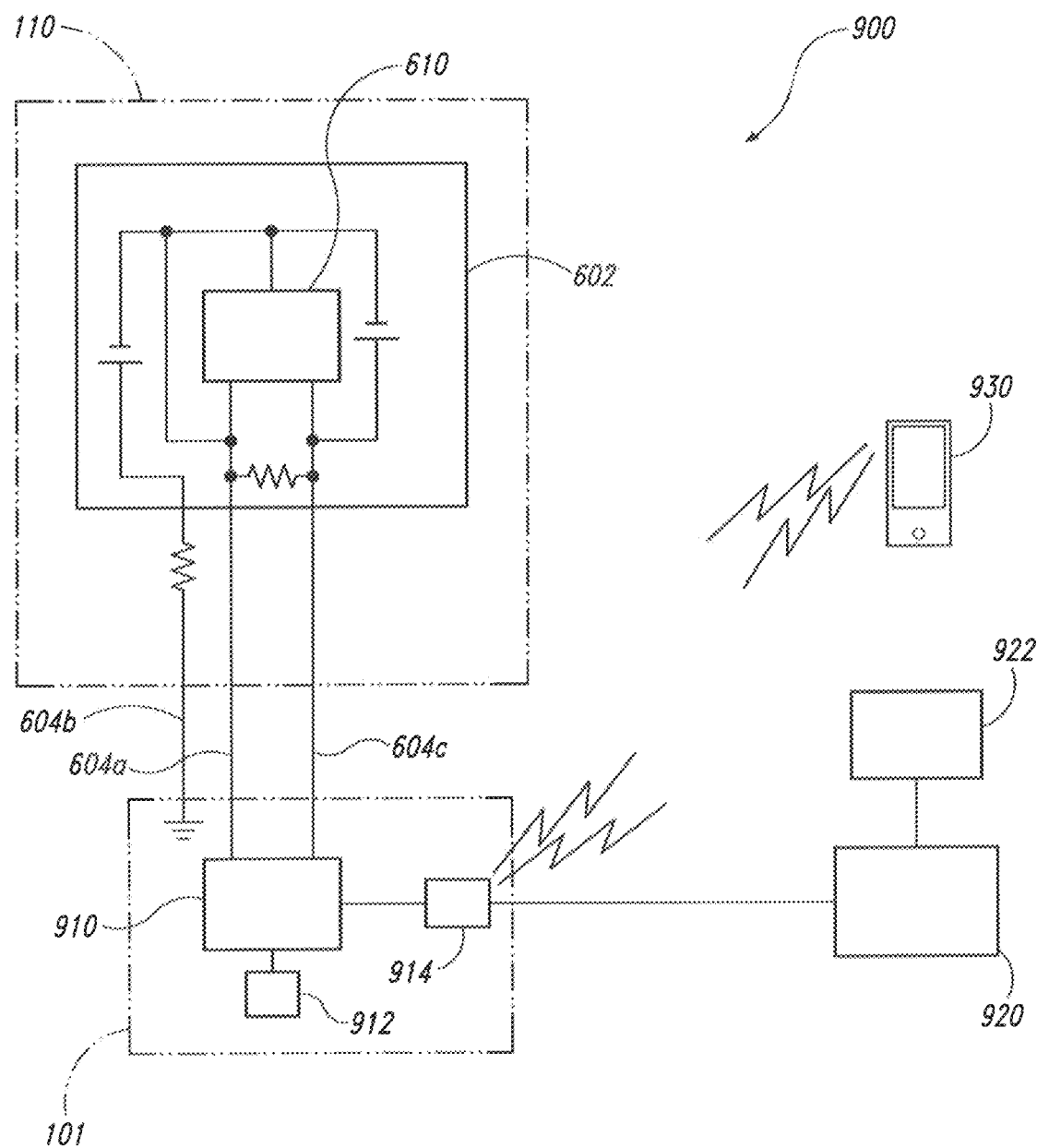
FIG. 9 is a schematic diagram of a vehicle system that can be used with the buckle assembly of FIGS. 1 and 2 in accordance with embodiments of the present technology.

FIG. 9 is a schematic diagram of a system 900 that includes the buckle assembly 110 and the child seat 101 described above, configured in accordance with embodiments of the present technology. In the illustrated embodiment, the child seat 101 houses a microcontroller 910 that is operably connected to the buckle switch 610 by means of the leads 604a-604c. The microcontroller 910 can receive operating power from a power source 912 (e.g., a battery), and is operably connected to a communication device 914. In some embodiments, the communication device 914 can include an electrical connector (e.g., a USB port or other electrical connector) that provides a wired connection to an electrical system 920 of the vehicle in which the child seat is placed. In other embodiments, the communication device 914 can include a wireless transmitter (e.g., such as a Bluetooth module) that provides a wireless connection to the vehicle electrical system 920 and/or to a personal handheld device 930 (e.g., a smartphone). In some embodiments, the vehicle electrical system 920 can include an on-board diagnostic module (and/or other suitable processing devices, memory, etc.) that is operably connected to a warning indicator 922. The warning indicator 922 can include, for example, a dashboard mounted indicator light and/or an audible device (e.g. a buzzer or beeper) that provides a signal indicating the engagement status of the buckle assembly 110.

Referring to FIGS. 8A, 8C, and 9 together, when the buckle latch 350 is in the unlatched position shown in FIG. 8A, the switch 610 can provide a first voltage signal to the microcontroller 910 corresponding to the buckle assembly 110 being in the "unlatched" state. The microcontroller 910 can communicate this information to the vehicle electrical system 920 via, e.g., a wired link or a wireless (e.g., Bluetooth) link. If the vehicle is moving and there is a child present in the child seat 101, the vehicle electrical system 920 can respond to the indication that the buckle assembly 110 is unlatched by causing the indicator 922 to provide an audible and/or visible warning signal to the vehicle driver or other operator. The operator can then respond by coupling the web connectors 112 to the latch assembly 110 as described above, thereby causing the magnet 382 to move away from the switch 610 as shown in FIG. 8C. This changes the output voltage from the switch 610, which the vehicle system 920 can interpret as an indication that the buckle assembly 110 has been properly latched, thereby causing the warning indicator 922 to cease providing the warning signal. In another aspect of this embodiment, the vehicle electrical system 920 can be configured to provide an alarm via the indicator 922 if the vehicle is not running (e.g., the vehicle is parked) and the buckle assembly 110 is latched as shown in FIG. C, indicating that a child may still be secured in the child seat 101 even though the vehicle has been parked. By providing an alarm to notify the vehicle operator of this situation, the vehicle electrical system 920 can potentially prevent a child from being inadvertently left in a child seat after the vehicle has been parked.

In addition to communicating signals from the switch 610 to the vehicle electrical system 920 as described above, in some embodiments the microcontroller 910 can communicate buckle engagement information to the handheld device 930, such as to a smartphone of the vehicle driver or other vehicle occupant. In these embodiments, the communication device 914 would include a wireless transmitter (e.g., a Bluetooth transmitter) that can communicate the buckle status information to the handheld device 914 by, for example, sending a text message to the cell number of the handheld device 930, placing a call to the device 130, and/or otherwise causing a warning signal to be displayed on the device 130 that communicates the status of the buckle assembly 110. Although specific circuitry is described above with reference to FIG. 9, those or ordinary skill in the art will recognize that a microprocessor-based system could also be used where any logical decisions are configured in software, or hardwired or preprogrammed in chips, such as EEPROM semiconductor chips.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims. Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

I claim:

1. A restraint system, comprising:
   at least one web connector having a tongue; and
   a buckle assembly including
      a housing having an opening configured to receive the tongue;
      a latch operably positioned in the housing, wherein the latch is configured to move between a first latch position in which the latch is disengaged from the tongue and a second latch position in which the latch is engaged with the tongue;
      a magnet mounted to the latch, wherein movement of the latch from the first latch position to the second latch position moves the magnet from a first magnet position to a second magnet position; and
      an electronic switch operably positioned in the housing, wherein movement of the magnet from the first magnet position to the second magnet position changes an operational state of the electronic switch.

2. The restraint system of claim 1 wherein the latch is configured to pivot between the first and second latch positions.

3. The restraint system of claim 1 wherein the magnet is fixedly attached to the latch.

4. The restraint system of claim 1 wherein the magnet is fixedly attached to the latch, and wherein the magnet moves away from the electronic switch as the latch moves from the first latch position to the second latch position.

5. The restraint system of claim 1, further comprising:
   a frame fixedly attached to the housing and having an opening, wherein the latch has a first end portion pivotally coupled to the frame and a second end portion having a locking feature configured to extend through the opening in the frame and engage the tongue when the latch is in the second latch position.

6. The restraint system of claim 5 wherein the frame is positioned adjacent a first side of the latch and the magnet is fixedly attached to a second side of the latch, opposite to the first side.

7. The restraint system of claim 1 wherein the electronic switch includes a Hall effect sensor that varies output voltage in response to movement of the magnet from the first magnet position to the second magnet position.

8. The restraint system of claim 1 wherein the web connector is a first web connector and the tongue is a first tongue, and wherein the restraint system further comprises:
   a second web connector having a second tongue, wherein the opening is configured to receive the first and second tongues, and wherein the latch is configured to engage the first and second tongues when the latch is in the second latch position.

9. The restraint system of claim 1, further comprising:
   a child seat;
   a first web operably connecting the web connector to the child seat; and
   a second web operably connecting the buckle assembly to the child seat.

10. The restraint system of claim 1 wherein the electronic switch is configured to be operably connected to a warning system having at least one of a visual alarm or an audible alarm, and wherein the electronic switch is configured to send a signal to the warning system to change the operational status of the at least one visual alarm or audible alarm in response to movement of the latch from the first latch position to the second latch position.

11. The restraint system of claim 10, further comprising:
   a child seat;
   a first web operably connecting the web connector to the child seat; and
   a second web operably connecting the buckle assembly to the child seat, wherein at least one of the child seat or the buckle assembly includes a wireless communication device configured to transmit the signal from the electronic switch to the warning system.

12. The restraint system of claim 1, further comprising:
   a child seat configured to be positioned in a vehicle having a warning system;
   a first web operably connecting the web connector to the child seat; and
   a second web operably connecting the buckle assembly to the child seat, wherein the electronic switch is configured to send a first signal to the warning system to activate at least one of a visual alarm or an audible alarm when the latch is in the first latch position and the vehicle is operating, and wherein the electronic switch is further configured to send a second signal to the warning system to deactivate the at least one visual alarm or audible alarm when the latch is in the second latch position and the vehicle is operating.

13. A restraint system for use with a child seat, the restraint system comprising:
   a web configured to be operably coupled to the child seat;
   a web connector operably coupled to the web, the web connector having a tongue; and
   a buckle assembly configured to be operably coupled to the child seat, the buckle assembly including
      a housing;
      a latch operably positioned in the housing, wherein the latch is configured to move between a first latch position in which the latch is disengaged from the tongue and a second latch position in which the latch is engaged with the tongue;
      a magnet operably coupled to the latch, wherein movement of the latch from the first latch position to the second latch position moves the magnet from a first magnet position to a second magnet position; and
      an electronic switch operably positioned in the housing, wherein movement of the magnet from the first magnet position to the second magnet position changes an operational state of the electronic switch, and wherein the second magnet position is farther from the electronic switch than the first magnet position.

14. The restraint system of claim 13 wherein the electronic switch includes a Hall effect sensor.

15. The restraint system of claim 13 wherein the magnet moves away from the electronic switch as the magnet moves from the first magnet position to the second magnet position, and wherein movement of the magnet to the second magnet position causes the electronic switch to provide a signal indicating proper engagement of the tongue by the buckle assembly.

16. The restraint system of claim 13 wherein the web is a first web, the web connector is a first web connector, and the tongue is a first tongue, and wherein the restraint system further comprises:
   a second web configured to be operably coupled to the child seat; and
   a second web connector operably coupled to the second web, the second web connector having a second tongue, wherein the latch is configured to move from the first latch position to the second latch position when both the first and second tongues are simultaneously inserted into the housing, and wherein the latch is further configured to remain in the first latch position when only one of the first or second tongues is inserted into the housing.

17. A method for operating a buckle assembly configured to releasably engage at least one web connector tongue, wherein the buckle assembly includes a latch operably positioned in a housing, the method comprising:
   receiving the connector tongue in the housing;
   moving the latch from a first latch position spaced apart from the connector tongue to a second latch position engaging the connector tongue in response to receiving the connector tongue in the housing, wherein the buckle assembly further includes a magnet mounted to the latch and an electronic switch positioned in the housing, and wherein moving the latch includes moving the magnet relative to the switch; and
   activating the switch in response to moving the magnet, wherein activating the switch causes the switch to provide a signal indicating proper engagement of the connector tongue by the buckle assembly.

18. The method of claim 17 wherein moving the latch from the first latch position to the second latch position includes pivoting the latch toward the connector tongue.

19. The method of claim 17 wherein moving the latch from the first latch position to the second latch position includes moving the magnet away from the switch.

20. The method of claim 17 wherein activating the switch in response to moving the magnet includes activating a Hall effect sensor in response to a magnetic field.

* * * * *